United States Patent [19]

Shuler

[11] Patent Number: 5,251,697
[45] Date of Patent: Oct. 12, 1993

[54] METHOD OF PREVENTING IN-DEPTH FORMATION DAMAGE DURING INJECTION OF WATER INTO A FORMATION

[75] Inventor: Patrick J. Shuler, Yorba Linda, Calif.

[73] Assignee: Chevron Research and Technology Company, San Francisco, Calif.

[21] Appl. No.: 857,148

[22] Filed: Mar. 25, 1992

[51] Int. Cl.⁵ .................. E21B 43/02; E21B 43/20
[52] U.S. Cl. .................. 166/268; 166/278; 166/281; 166/305.1
[58] Field of Search ............. 166/268, 274, 275, 278, 166/281, 305.1

[56] References Cited

U.S. PATENT DOCUMENTS

| | | | |
|---|---|---|---|
| 2,193,775 | 3/1940 | Stratford | 166/278 |
| 3,022,827 | 2/1962 | Getzen | 166/305.1 X |
| 3,407,877 | 10/1968 | Harvey et al. | 166/274 |
| 3,443,640 | 5/1969 | Klein | 166/305.1 X |
| 3,516,496 | 6/1970 | Barkman, Jr., et al. | 166/281 |
| 3,675,717 | 7/1972 | Goins, Jr. et al. | 166/278 |
| 3,707,194 | 12/1972 | Svaldi | 166/305.1 |
| 3,724,548 | 4/1973 | Parker et al. | 166/275 |
| 4,579,668 | 4/1986 | Messenger | 166/294 X |

OTHER PUBLICATIONS

T. W. Lancey, K. Kammula, "Prediction of Filtration Efficiencies of Water Injection Systems," Pac Coast Oil Show & Conf. (Bakersfield, CA, Proc. '86 86.11.04–06).
D. D. Sparlin, "Advances in Well Completion Technology," J. Petrol. Technol. vol. 34, No. 1, pp. 17–18, Jan. 1982.

*Primary Examiner*—George A. Suchfield
*Attorney, Agent, or Firm*—W. K. Turner; E. A. Schaal

[57] ABSTRACT

In-depth formation damage is prevented during water injection by adding to the water non-compressible solids of sufficient size and concentration to form an external filter cake within the injection well. Preferably, the non-compressible solids are either diatomite, perlite, saw dust, or calcium carbonate, and the concentration of non-compressible solids is from 0.001 to 5 wt%. When no longer needed, the external filter cake is removed from the injection well by using an acid wash or back-flowing the well.

5 Claims, 1 Drawing Sheet

METHOD OF PREVENTING IN-DEPTH FORMATION DAMAGE DURING INJECTION OF WATER INTO A FORMATION

The present invention relates to a method of preventing plugging of a formation during water injections.

BACKGROUND OF THE INVENTION

Water is commonly injected downhole either as a means to improve oil recovery or as a means to dispose of waste water. Suspended solids in injected water tend to plug the formation and reduce the injectivity. Two plugging mechanisms occur—either the solids invade the porous media and clog pore throats, or the solids collect and build a filter cake.

Solids that invade the reservoir in-depth can cause permanent permeability damage because the solids are difficult to remove. On the other hand, if the solids form a filter cake within the well, the original permeability of the reservoir could be restored by removing the filter cake by back-flowing the well or by dissolving the filter cake with an acid solution. The nature of the solids and the reservoir dictate whether the plugging mechanism will be predominantly in-depth invasion or filter cake formation.

One common practice is to identify and eliminate processes that contribute to solids creation. For example, if a mix of incompatible waters causes solid scales to form, one would stop mixing these brines or would add a scale inhibitor to prevent solid formation.

Another common practice is to use surface filters to remove the suspended solids. Typically these filters are effective in removing the larger particles, leaving a minimal number of small particulates. But some operators are reluctant to install such filters on the surface facilities for such reasons as high capital and operating costs, problems in making the filters function correctly, and limited space on offshore platforms.

SUMMARY OF THE INVENTION

The present invention provides a method of preventing in-depth formation damage during water injection. In that method, non-compressible solids are added to the water. Those non-compressible solids are of sufficient size and concentration to form an external filter cake within the injection well.

Preferably, the concentration of non-compressible solids is from 0.001 to 5 wt%, and the non-compressible solids are materials such as diatomite, perlite, saw dust, or calcium carbonate. More preferably, the non-compressible solids are calcium carbonate so that the external filter cake can be removed from the injection well by using an acid wash.

BRIEF DESCRIPTION OF THE DRAWINGS

In order to assist the understanding of this invention, reference will now be made to the appended drawings. The drawings are exemplary only, and should not be construed as limiting the invention.

DETAILED DESCRIPTION OF THE INVENTION

Figure 1:
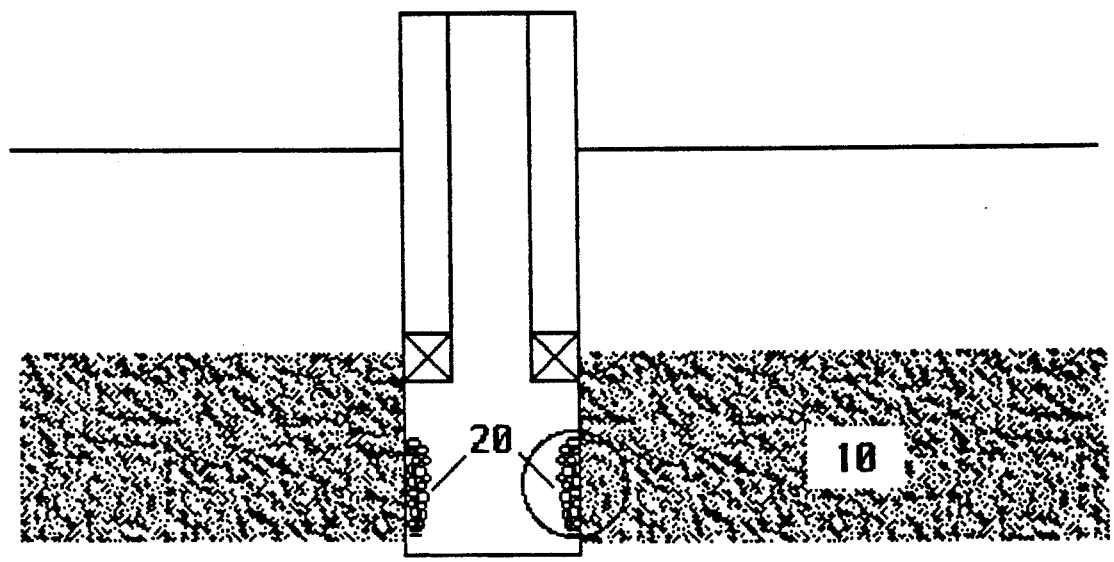
FIG. 1 shows a schematic drawing of how the filter cake could form in the injection well.
Figure 1A:
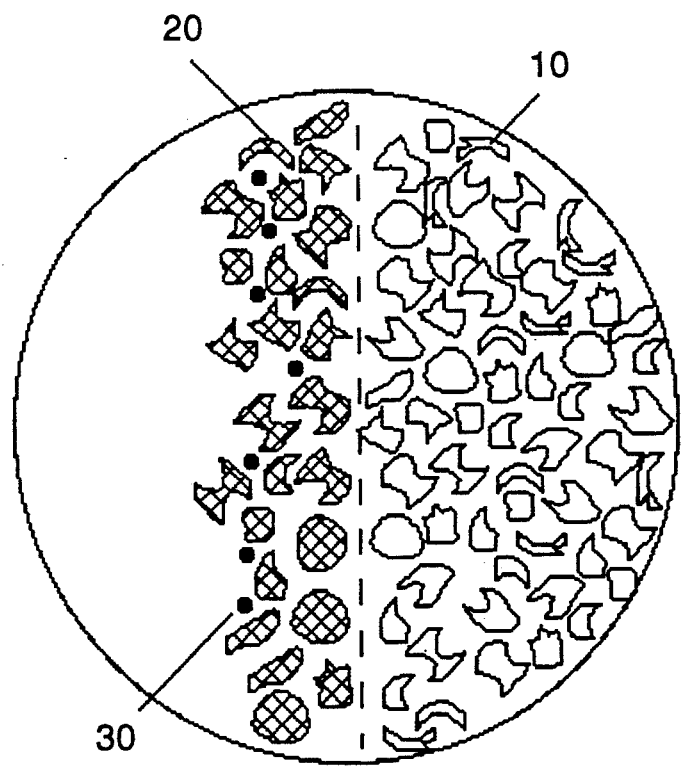
FIG. 1A shows an enlarged view of how the filter cake could form in the injection well.

In its broadest aspect, the present invention involves preventing in-depth formation damage during injection of water into an injection well within a formation. This is done by adding non-compressible solids to the water. The present invention can be used as either an alternative or as a supplement to surface filtration.

The idea is to inject a low concentration slurry of solids into the injection brine. These additional solids will be of the right size and nature (hard solids, not compressible) such that a relatively high permeability filter cake will form in the injection wellbore. This filter cake will screen out most of the fine particulates present in the injection water, thereby preventing the less desirable in-depth type of damage that the untreated injection water will cause. Eventually, the filter cake will build up to the point of restricting injectivity too much, and it would then be removed. After stimulation, more solids are added with resumption of water injection.

By "non-compressible solids," we mean materials that will deform relatively little (less than 5% volume change) even when subjected to high stress (3,000 psi). It is important that the solids be non-compressible because the external filter cake formed will not then lose significant porosity under high injection pressure. By maintaining its porosity, the filter cake will also maintain its permeability. The permeability will decline only slowly as it captures the injection water solids.

Types of non-compressible solids that could be used include diatomite, perlite, saw dust, and calcium carbonate. Calcium carbonate is the preferred non-compressible solid because it is readily acid-soluble. This means that the filter cake may be removed by a quick, cheap acid wash in the wellbore.

This process is ideal for a situation where:
the total suspended solids concentration is low;
the suspended solids are small and have a "gel-like" character, thus they are prone to cause severe in-depth plugging;
there is a thick injection interval; and
the permeability (and injection rate) is relatively low.

In other words, this invention should be used when one is trying to control a high potential degree of damage caused by a low concentration of solids. This assumes that it will take a long time to build up the filter cake to an unacceptable condition (only infrequent simulation required) because the flow rate is low and the wellbore area is large.

The non-compressible solids are added to the water by pumping the solids as a slurry into the injection water, or by adding the solids directly to the injection water. For example, one could add the solids into a mix tank prior to injection.

These non-compressible solids are of sufficient size and concentration to form an external filter cake within the injection well. By "external filter cake," we mean a porous pack of non-compressible solids that is outside the reservoir formation. By "within the injection well," we mean that this external filter cake forms downhole across the reservoir formation that accepts the injection water.

By "of sufficient size and concentration to form an external filter cake within the injection well," we mean the size of the non-compressible solids should be approximately the same as the average pore throat size of the reservoir formation. This will ensure the solids form an external filter cake and do not invade and plug the reservoir. Preferably, the concentration of non-compressible solids is from 0.001 to 5 wt%, depending on the concentration of solids to be removed from the injection water. The added non-compressible solids should be from 25% to 300% of the injection water solids concentration, and most preferably, from 50 to 200%.

When the external filter cake needs to be removed, it can be removed from the injection well by using an acid wash. By "acid wash," we mean circulating an acid solution down the wellbore past the external filter cake, and then returned to surface for disposal. The preferred acid is hydrochloric acid.

FIG. 1 shows a schematic drawing of how the filter cake would form within an injection well. The well is in reservoir 10. The non-compressible solids 20 are injected with the water and are stopped at the face of the reservoir, thereby forming a filter cake. This filter cake captures fine particulates 30 that would otherwise enter the reservoir and damage the permeability of the reservoir.

While the present invention has been described with reference to specific embodiments, this application is intended to cover those various changes and substitutions that may be made by those skilled in the art without departing from the spirit and scope of the appended claims.

What is claimed is:

1. A method of preventing in-depth formation damage during injection of water into an injection well within a formation comprising adding to said water non-compressible solids of sufficient size and concentration to form a permeable external filter cake within the injection well.

2. A method according to claim 1 wherein the concentration of non-compressible solids is from 0.001 to 5 wt%.

3. A method according to claim 1 wherein the non-compressible solids comprise a solid selected from the group consisting of diatomite, perlite, saw dust, and calcium carbonate.

4. A method according to claim 3 wherein the non-compressible solids comprise calcium carbonate.

5. A method according to claim 4 wherein the external filter cake is removed from the injection well by using an acid wash.

* * * * *